US012267567B2

(12) United States Patent
Panis

(10) Patent No.: US 12,267,567 B2
(45) Date of Patent: *Apr. 1, 2025

(54) WATERMARKING MULTIMEDIA FRAGMENTS INTO TWO OR MORE VARIANTS

(71) Applicant: Nagravision S.A., Cheseaux-sur-Lausanne (CH)

(72) Inventor: Jacobus Panis, Cheseaux-sur-Lausanne (CH)

(73) Assignee: NAGRAVISION S.A., Cheseaux-sur-Lausanne (CH)

(*) Notice: Subject to any disclaimer, the term of this patent is extended or adjusted under 35 U.S.C. 154(b) by 0 days.

This patent is subject to a terminal disclaimer.

(21) Appl. No.: 18/544,544

(22) Filed: Dec. 19, 2023

(65) Prior Publication Data

US 2024/0137624 A1 Apr. 25, 2024
US 2024/0236444 A9 Jul. 11, 2024

Related U.S. Application Data

(63) Continuation of application No. 17/629,022, filed as application No. PCT/EP2020/071008 on Jul. 24, 2020, now Pat. No. 11,889,164.

(30) Foreign Application Priority Data

Jul. 24, 2019 (EP) .................................... 19188058

(51) Int. Cl.
*H04H 60/32* (2008.01)
*H04N 21/8358* (2011.01)
(Continued)

(52) U.S. Cl.
CPC ..... *H04N 21/8358* (2013.01); *H04N 21/8456* (2013.01); *H04N 21/47202* (2013.01)

(58) Field of Classification Search
CPC ......... H04N 21/23611; H04N 21/2541; H04N 21/47202; H04N 21/8358; H04N 21/8456
See application file for complete search history.

(56) References Cited

U.S. PATENT DOCUMENTS 11,889,164 B2    1/2024   Panis
2007/0174623 A1  7/2007   Watson
(Continued)

FOREIGN PATENT DOCUMENTS

CN    101128834 A    2/2008
CN    101268491 A    9/2008
(Continued)

OTHER PUBLICATIONS

International Search Report and Written Opinion dated Sep. 11, 2020 for PCT Application No. PCT/EP2020/071008, 10 pages.

*Primary Examiner* — Gigi L Dubasky
(74) *Attorney, Agent, or Firm* — POLSINELLI LLP

(57) ABSTRACT

A method of processing a multimedia fragment into two or more variants of the multimedia fragment, each variant having a different watermark, the method comprising: fragmenting a multimedia content into a sequence of fragments; watermarking a plurality of the fragments to create two or more variants of each of the plurality of fragments, wherein the two or more variants of one fragment are watermarked using different watermarks; adjusting the length of the two or more variants for at least one of the fragments to a same adjusted length, wherein the adjusted length is indicative of a temporal position of the two or more variants of the at least one of the fragments compared to variants of other fragments in the sequence of fragments.

18 Claims, 3 Drawing Sheets

(51) Int. Cl.
  *H04N 21/845*  (2011.01)
  *H04N 21/472*  (2011.01)

(56) References Cited

U.S. PATENT DOCUMENTS

| | | | |
|---|---|---|---|
| 2014/0019767 A1* | 1/2014 | Jarnikov | H04N 21/44008 |
| | | | 713/176 |
| 2016/0261664 A1* | 9/2016 | Lotfallah | H04L 65/65 |
| 2016/0301958 A1 | 10/2016 | Srinivasan | |
| 2017/0316189 A1 | 11/2017 | Winograd | |
| 2018/0352307 A1* | 12/2018 | Giladi | H04N 21/234345 |
| 2020/0186894 A1 | 6/2020 | Throwirth | |

FOREIGN PATENT DOCUMENTS

| | | |
|---|---|---|
| CN | 105850144 A | 8/2016 |
| JP | 2012065258 | 3/2012 |
| JP | 2015080164 | 4/2015 |

\* cited by examiner

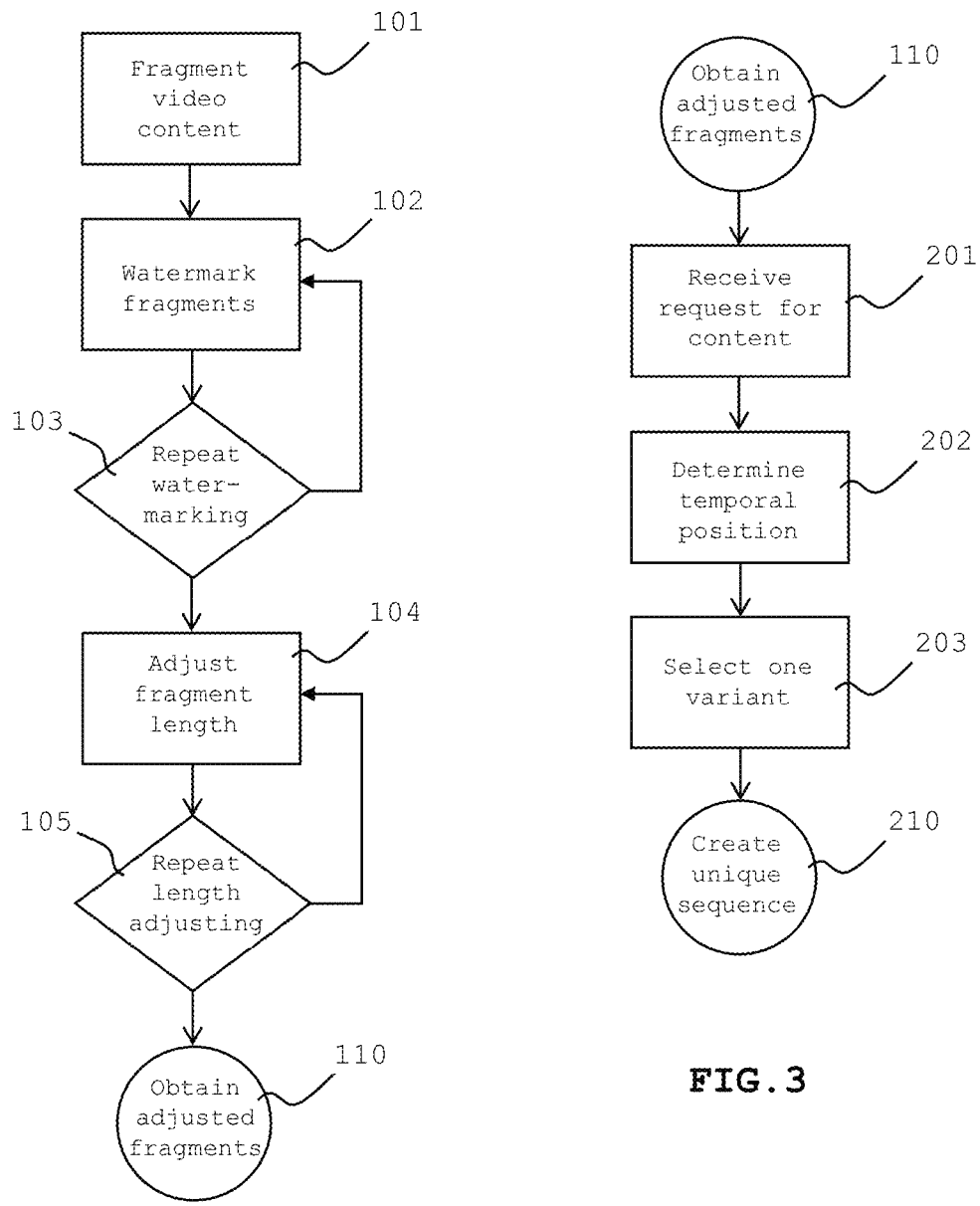

FIG. 4

| GOP # | Size A | Size B |
|---|---|---|
| 0 | 16393 | 16235 |
| 1 | 19534 | 19475 |
| 2 | 23364 | 23294 |
| 3 | 18463 | 18393 |
| 4 | 5548507 | 5554169 |
| 5 | 5083205 | 5089651 |
| 6 | 912491 | 894850 |
| 7 | 779146 | 785802 |
| 8 | 459644 | 461700 |
| 9 | 218293 | 219687 |
| 10 | 195342 | 195257 |

(41)

| GOP # | Size A | Size B |
|---|---|---|
| 0 | 16393 | 16393 |
| 1 | 19534 | 19534 |
| 2 | 23364 | 23364 |
| 3 | 18463 | 18463 |
| 4 | 5554169 | 5554169 |
| 5 | 5089651 | 5089651 |
| 6 | 912491 | 912491 |
| 7 | 785802 | 785802 |
| 8 | 461700 | 461700 |
| 9 | 219687 | 219687 |
| 10 | 195342 | 195342 |

(42)

| Frag # | Size A | Size B |
|---|---|---|
| 0 | 17051 | 17051 |
| 1 | 20191 | 20191 |
| 2 | 24021 | 24021 |
| 3 | 19120 | 19120 |
| 4 | 5554826 | 5554826 |
| 5 | 5090308 | 5090308 |
| 6 | 913148 | 913148 |
| 7 | 786459 | 786459 |
| 8 | 462357 | 462357 |
| 9 | 220344 | 220344 |
| 10 | 195999 | 195999 |

(43)

| Frag # | Size A | Size B |
|---|---|---|
| 0 | 17056 | 17056 |
| 1 | 20193 | 20193 |
| 2 | 24034 | 24034 |
| 3 | 19139 | 19139 |
| 4 | 5554852 | 5554852 |
| 5 | 5090309 | 5090309 |
| 6 | 913158 | 913158 |
| 7 | 786471 | 786471 |
| 8 | 462376 | 462376 |
| 9 | 220361 | 220361 |
| 10 | 196010 | 196010 |

(44)

| Symbol index |
|---|
| 0 |
| 1 |
| 2 |
| 3 |
| 4 |
| 5 |
| 6 |
| 7 |
| 8 |
| 9 |
| 10 |

(45)

301 302 303 304

WATERMARKING MULTIMEDIA FRAGMENTS INTO TWO OR MORE VARIANTS

TECHNICAL FIELD

The present disclosure relates to a method of processing a video fragment into two or more variants of the video fragment, a method of selecting variants of video fragments for delivery to a requestor, a variant preprocessor module, a head-end system, a watermark embedder module, and a CDN server.

BACKGROUND ART

Streamed video, both live and on-demand, is growing in popularity with viewers. Thanks to a wide array of networks and consumer devices, it is becoming accessible anywhere and at any time across a multitude of devices. Video also comes in many forms, from user generated content videos on social media outlets to ultra-high quality and high-definition professional content, including world class sporting events and first run movies delivered by licensed Internet streaming services.

Although the Internet serves as a great delivery mechanism for streamed video, it is also a popular distribution channel for pirated content. To safeguard revenues both content owners and operators have interest to protect licensed video content from piracy. In the licensing terms, content protection is also a typical requirement from content owners to operators. The ability to prevent piracy, take down illegal content, and act against illegal sources are key objectives of content protection. Meeting these objectives requires the use of a variety of technologies including watermarking and others such as Digital Rights Management (DRM), fingerprinting, and cryptography.

The protection of commercial video content from piracy is obviously important to content owners and is typically a requirement for distributors in the licensing terms. Watermarking is a useful tool to combat theft as it permits tracing stolen copies back to the source of the leak. Improvements in watermarking technology have advanced to the point that it is now practical to embed watermarks containing distributor identifiers, content identifiers, and subscriber identifiers for nearly all types of content including live content, delivered to individual subscribers.

Watermarking is the technique of embedding data into either the audio or video portions of an asset that can be reliably extracted, even if the asset has been modified. In the event of modification, the watermark is designed to travel along with the asset without itself being modified.

The implementation details to embed, and later extract, watermarks vary by watermarking technology provider. They share fundamental similarities to embed data that can later be extracted by a detector. Watermarks may be used for forensic identification of the sources of pirated content.

Forensic watermarking is intended to provide a means to identify the source of leaked content at the distributor level, at the more granular device level, or even the subscriber level. When leaked content is found on piracy sites, it can be analyzed for any embedded marks which, when extracted, can provide chain of custody through to device/subscriber identification depending on the marks present. This information can then be employed by investigative teams to locate the leak source and act to stop future piracy.

Forensic watermarking provides anti-piracy functionality, however, there are many uses where watermarking can add value in the content delivery chain. Example application areas for watermarking are: digital cinema where watermarks do not apply to individual users, but can be used to identify the theater, date, and time where the content was screened; screeners where watermarks can be used to identify the viewer that received the screening copy; physical media where watermarking is attached to the physical media such as a Blu-ray disc, that later can be used to determine the playback device used for capture and illegal distribution; (premium) Video on Demand (VoD) where forensic watermarks are typically used to identify subscribers who redistribute content; live streaming where forensic identification needs to be fast to reduce the end-to-end delay from scanning online piracy services, extracting the watermark from illegal content, and the issuing of take down notices or switching off the illegal retransmission at the source.

VoD and live applications typically use video distribution over IP networks. The use of a watermark can be used to determine the network and/or service provider responsible for delivering a piece of content and the user that accessed the content. This use-case has increasing relevance as distribution of valuable content through IP networks is becoming closer to the release dates, making the content more valuable. Since the quality of the IP source video is increasing, the pirate can still provide a very high-quality copy, even after several generations.

Many watermarking systems permit layered watermarks where the mark can be inserted at different stages of the content packaging and distribution workflows without interfering or replacing one another. Such layered watermarks can be used to recreate the entire chain of custody should pirated content be found on sharing sites, social media sites, as well as streaming devices.

With two-step watermarking the watermark embedding process is based on two sequential steps: one step to pre-compute different variants for different parts of the video asset and a second step to compose a unique combination of variants to encode the desired watermark identifier.

The rationale for splitting the watermarking in two steps is to offload the computational burden in the first step to make the second step as simple and scalable as possible. The second step generates a unique sequence of variants that encodes the desired watermark identifier. The sequence of variants typically encodes the watermark identifier with sufficient redundancy to establish reliable forensic evidence. Therefore, it can be integrated at any point in the video delivery network where an identifier is available. Two-step embedding enables server side embedding that creates requirements on the server such as VoD server or Content Distribution Network (CDN) edge but is transparent to the client. It alternatively enables embedding on the client before decoding.

Fragment watermarking can be used for over-the-top (OTT) streaming technologies. For adaptive bit-rate (ABR) support, each content is typically available in different quality levels, also known as renditions, and is chunked in smaller portions named fragments. Playback devices may decide on fragment boundaries to switch between the available renditions to optimize the viewing experience. Fragment watermarking leverages the same mechanism to insert a watermark message by selecting a unique sequence of fragment versions over time based on the unique ID that is to be inserted.

Input to the watermark decision for a single fragment is typically: (i) time related information corresponding to the requested fragment, typically a timestamp or index number carried in the file name; and (ii) unique identifier to be inserted.

Fragments can be physically present as separate files or be stored in a single file as virtual fragments. In the latter case, a virtual fragment can be accessed via a byte-range request.

For obtaining 'time' information for virtual fragments in case of byte-range requests, it is known to use a mapping table that maps the requested byte-range to time. For each fragment byte-range request a look-up to the mapping table is performed to retrieve the correct time required for computing the correct watermark decision. This mapping table is typically stored as a file on the content delivery network (CDN), next to the content and would be requested whenever a CDN edge server would need to compute the watermark decision. As bit rates vary per content and rendition, this mapping table is unique per content and per rendition.

Not all CDN providers support outgoing requests to be processed on their CDN edge server. As a result, it is not always possible to access an external mapping table while processing a fragment request. To overcome this shortcoming, it has been suggested to use a fixed mapping of byte-range to time, but this is considered inefficient and negatively impacts image quality when considering different bit rates.

Without access to the mapping table on the CDN edge server, the watermark decision cannot be computed, as the byte-range cannot be linked to time.

SUMMARY

The present disclosure proposes a solution for enabling watermarking decisions on e.g. a CDN edge server without using a mapping table.

According to an aspect of this disclosure a method is proposed of processing a video fragment into two or more variants of the video fragment, each variant having a different watermark. The method can comprise fragmenting a video content into a sequence of fragments. The method can further comprise watermarking a plurality of the fragments to create two or more variants of each of the plurality of fragments, wherein the two or more variants of one fragment are watermarked using different watermarks. The method can further comprise adjusting the length of the two or more variants for at least one of the fragments to a same adjusted length. The adjusted length can be indicative of a temporal position of the two or more variants of the at least one of the fragments compared to variants of other fragments in the sequence of fragments.

Herein, the term 'variant' is used to indicate a watermarked version of a fragment. From each fragment two or more variants can be created, meaning that a fragment can be watermarked using different watermarks to obtain different variants of the fragment.

A temporal position may take any form indicative of a position relative to another position in time. An example of a temporal position is a time reference indicative of an absolute or relative moment in time. Another example of a temporal position is an index number, indicative of a position in a sequence of positions.

Different fragments are typically watermarked using the same watermarks. For example, with A/B watermarking a first fragment can be watermarked using watermark A to obtain a first variant of the first fragment and using watermark B to obtain a second variant of the first fragment. A second fragment can be watermarked using the same watermark A to obtain a first variant of the second fragment and using the same watermark B to obtain a second variant of the second fragment. Subsequent fragments can then also be watermarked using the same watermarks A and B.

Advantageously, the thus obtained watermarked variants of the fragments have their temporal position embedded in the length of the variants. The length of the variants is thus indicative of the position in time, enabling e.g. a CDN edge server to obtain the temporal position without a mapping table.

In an embodiment the adjusting of the length can comprise adding padding data to one or more of the variants of the at least one of the fragments.

In an embodiment the method can further comprise equalizing the length of the two or more variants for each of the fragments before adjusting the length. This enables the length of the variants of one fragment to be adjusted using the same amount of padding data, which eases the adjusting step.

In an embodiment the equalizing of the length can comprise adding padding data to one or more of the variants.

In an embodiment the adjusting of the length can result in the length of the variants of the at least one of the fragments to be larger than the length of the variants of a preceding fragment in the sequence of fragments. Thus, an increased length of a variant can indicate a later position in time of the variant.

In an embodiment the length of the variants of the at least one of the fragments can be one data unit larger than the length of the variants of the preceding fragment in the sequence of fragments. The data unit is preferably a byte, but can alternatively be a bit, a word, or any other data unit depending on the data format used for encoding the fragments and variants.

In an embodiment the two or more variants of each of the plurality of the fragments can be watermarked using the same or related watermarks as used for the two or more variants of the at least one of the fragments.

With e.g. A/B watermarking for ABR video content, typically the same watermarks may be used. It may be beneficial to use different but related watermarks to generate the different versions of fragments, for example in case of encoding a temporal position in each version to simplify reconstruction of the watermark message later on. For example, in case of A/B watermarking with related watermarks, even though there would be still two versions (A/B) for each fragment there could be e.g. 32 different A watermarks and 32 different B watermarks, indicating 32 different positions. All fragments containing a version A watermark would relate to the same class of watermarks (A), but it would not be the exact same watermark.

In an embodiment the temporal position can be defined as a position within a limited number of possible positions that is repeated in time. The adjusted length can reflect the position of a variant having the adjusted length within the limited number of possible positions. The temporal position represents for example a symbol index in a watermark message constructed from a sequence of selected variants, wherein the selected variants are one of the two or more variants of each of the fragments.

In an embodiment the temporal position of the variant can be derivable from the length of said variant modulo the limited number of possible positions. If for example a watermark message comprises 32 symbols, which may be repeated in time, the length of a variant modulo 32 can represent the symbol index in the watermark message.

In an embodiment the temporal position of one or more of the two or more variants can be derivable from an offset of a variant. This advantageously prevents hackers from indicating the wrong temporal position by requesting subsequent variants by simply requesting a same number of bytes for subsequent variants.

According to an aspect of this disclosure a method is proposed for selecting variants of video fragments for delivery to a requestor. The requestor is for example a client device or a playback device. The method can comprise receiving a request for all or a part of a video content that has been fragmented into a sequence of fragments. A plurality of the fragments can have been watermarked to create two or more variants of each of the plurality of the fragments according to the above described method of processing a video fragment into two or more variants of the video fragment. The method can further comprise determining a temporal position of the two or more variants of a fragment compared to variants of other fragments in the sequence of fragments. The method can further comprise selecting for each of the plurality of the fragments one variant from the two or more variants based on the determined temporal position and an identifier of the requestor. The identifier of the requestor is for example an identifier uniquely identifying the client device or the playback device. The identifier may identify a user or a customer. The identifier can define which of the two or more variants to select for each fragment based on the temporal position.

Advantageously, the watermarked variants of the fragments that have their temporal position embedded in the length of the variants can thus be used e.g. by a CDN edge server to obtain the temporal position of the variants without a mapping table. The temporal position can then be used to select the variant for each fragment to generate a watermark message without the need for a mapping table.

In an embodiment the temporal position can be defined as a position within a limited number of possible positions that is repeated in time, and wherein the temporal position is determined from the length of the variants modulo the limited number of possible positions.

In an embodiment the request can be received in the form of a byte-range request.

In an embodiment the method can further comprise detecting an out of bounds request indicative of the request being made to incorrect or non-existing variants.

In an embodiment the determining of the temporal position can be based on a cryptographic function such as an encryption or hashing function.

In an embodiment the determining of the temporal position can be further based on an offset of one or more of the two or more variants. This advantageously prevents hackers from requesting subsequent variants by simply requesting a same number of bytes for subsequent variants. Moreover, incorrect requests may be detected and logged.

In an embodiment the offset can received with the request. Thus, the requestor may be required to know the offset in order to obtain the variants.

In an embodiment the temporal position can depend on a secret. This advantageously makes it difficult for hackers to make invalid requests that look valid. The secret is typically known to the network entity where the request is being processed. This is especially advantageous when combined with a cryptographic function.

According to an aspect of this disclosure a variant preprocessor module is proposed that is configured to perform the above described method of processing a video fragment into two or more variants of the video fragment.

According to an aspect of this disclosure a head-end system is proposed that comprises a variant preprocessor module as described above.

According to an aspect of this disclosure a watermark embedder module is proposed that is configured to perform the above described method for selecting variants of video fragments for delivery to a requestor.

According to an aspect of the disclosure a CDN server is proposed that comprises a watermark embedder module as described above.

Hereinafter, embodiments of the disclosure will be described in further detail. It should be appreciated, however, that these embodiments may not be construed as limiting the scope of protection for the present disclosure.

BRIEF DESCRIPTION OF DRAWINGS

Embodiments will now be described, by way of example only, with reference to the accompanying schematic drawings in which corresponding reference symbols indicate corresponding parts, and in which:

FIG. 2 shows a flow diagram of a method according to an exemplary embodiment of this disclosure;

FIG. 3 shows a flow diagram of a method according to another exemplary embodiment of this disclosure; and FIG. 4 shows an exemplary byte-range padding example for generating and selecting variants of fragments of a video content according to an exemplary embodiment of this disclosure.

Figure 1:
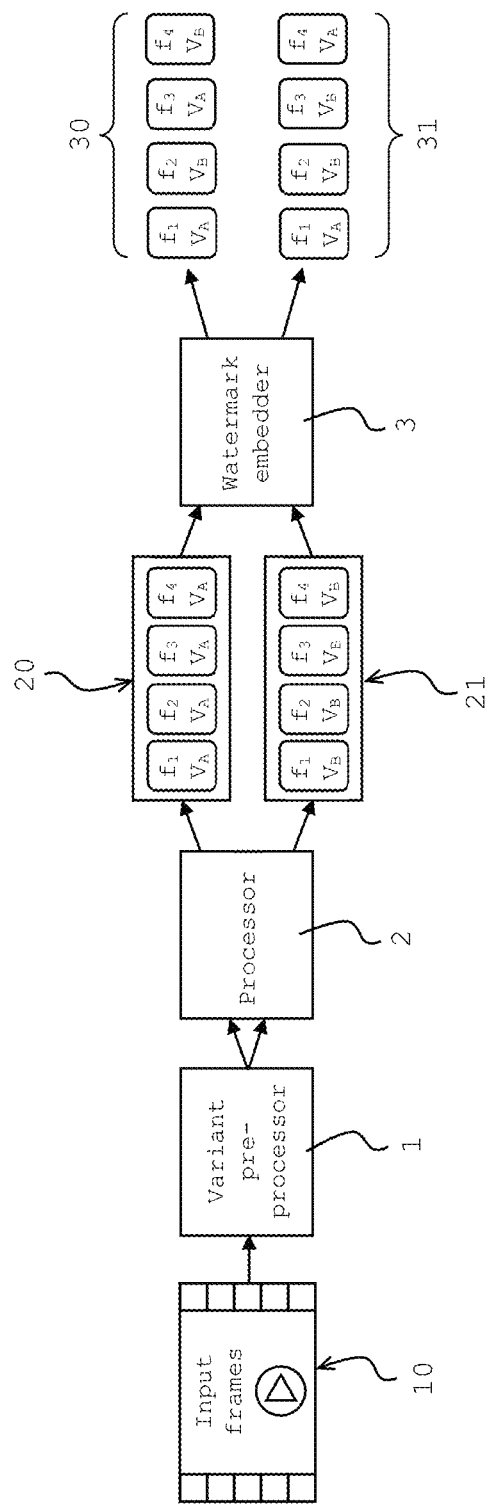
FIG. 1 shows a system architecture including inputs and outputs of system components according to an exemplary embodiment of this disclosure.

The figures are meant for illustrative purposes only, and do not serve as restriction of the scope or the protection as laid down by the claims.

DESCRIPTION OF EMBODIMENTS

The following examples are based on two-step watermarking in the form of A/B watermarking for ABR video content. It will be understood that this disclosure is not limited to this example and may be applied to any video content that is fragmented and watermarked into variants. Also, the disclosure is not limited to two variants per fragment as in A/B watermarking, but any number of variants may be generated and used.

With A/B watermarking a variant has the same size as the video segments used by the delivery network and there are two variants per video segment, version A and version B. The client device can use playlist manipulation or segment selection at the (CDN) edge to only receive a collection of video segments encoded with its watermark identifier.

As shown in FIG. 1, the first step of a two-step watermarking may be a preprocessing step for computing sets of variants for an input video content 10. The first step is typically performed once per input video content 10. In this example, a variant preprocessor 1 takes the input frames 10, and transforms them into two intermediate versions. For one or more of the frames in the intermediate versions the length of the variants may be adjusted by processor 2, as will be explained in more detail below, to obtain two sets of variants 20, 21 with adjusted lengths, which allows for fast embedding at a later stage by selecting which version is used for actual play-out. The variant preprocessor 1 and the processor 2 may be implemented as two separate apparatus, may be integrated into a single apparatus, or may be one and the same processor configured to perform both tasks.

Both versions 20, 21 are typically visually identical, but they differ in a subtle manner due to watermark insertion. In the first step, the watermark preprocessor 1 may provide variants of the baseband content to a video encoder. The resulting sets of variants 20, 21 are typically encoded and packetized in a relevant container for transport.

In FIG. 1 a first set of variants 20 includes four variants $f_1V_A \ldots f_4V_A$ and a second set of variants 21 includes four variants $f_1V_B \ldots f_4V_B$. Herein, f1 ... f4 indicate four frames that have been watermarked to obtain a variant of the frames. $V_A$ and $V_B$ indicate a variant A and a variant B of the respective frame. The length of the variants have been adjusted to allow a temporal position of the variant in a stream of fragments to be determined at a later stage.

Variants may be generated by analyzing the video content, typically frame-by-frame, either in the baseband domain (prior to encoding) or in the encoded domain (post encoding). The variants may be pre-watermarked variations of segments (i.e., chunks or fragments) of the video bitstream that can be used interchangeably without affecting the viewing experience while still providing means to perform forensic watermarking. The length of a variant may differ between watermarking suppliers, ranging from a couple of bytes to a whole video segment in Adaptive Bit Rate (ABR) video networks.

In the first step of the two-step watermarking, a watermark algorithm may define basic properties of a watermarking system. Depending on the application area, an algorithm may e.g. be tailored to support short fragment lengths or tuned to carry large payloads. As a consequence, different algorithms are typically not directly compatible with each other, requiring all components of the watermarking system to use the same algorithm.

The second step of the two-step watermarking may be responsible for creating a serialized video bitstream 30, 31 that uniquely identifies the recipient to whom it is delivered. The second step is typically implemented by a watermark embedder 3 that has access to a watermark identifier that is used to generate a unique variant sequence 30, 31, by selecting for each set of variants 20, 21 a single variant. This variant sequence 30, 31 is part of the final forensically watermarked video content that may comprise unaltered segments of video. This operation can be performed in transit (e.g., in a network edge) or in the client device (e.g., during playback or PVR recording).

With A/B watermarking, the embedder is rewriting the fragment requests from a requestor to provide back the A or B version of the requested fragment. One version of fragment (A or B) may be selected based on fragment start time and the unique ID value that is to be inserted in the watermark. This start time is typically part of the fragment filename, for example in case of DASH timeline, but when using byte-range requests, this byte-range needs to be translated to a fragment start time. The same can also be applied to HLS when respecting the file naming or byte-range translate approach.

The watermark embedding (second step) process may be performed by a Variant Sequence Generator (VSG) that selects for each fragment $f_1 \ldots f_4$ a single variant $V_A$ or $V_B$ from each set of variants 20, 21 and thus produces a variant sequence that encodes the desired watermark identifier, and a watermark embedder (EMB) that applies the selected variant to the compressed video bitstream in order to obtain a Variant sequence 30, 31, which is a video watermarked with a unique identifier. In the example of FIG. 1 the video sequence 30 may be generated for a first end user and includes the following unique watermarks for fragments $f_1$ to $f_4$: ABAB. The video sequence 31 may be generated for a second end user and includes the following unique watermarks for fragments $f_1$ to $f_4$: ABBA.

If the variant data is applied in independent encryption blocks, they may be applied in the encrypted domain without knowledge of the decryption key.

The VSG receives set of variants in a relevant container. Based on the watermark identifier, it produces a sequence of variants, and the EMB applies them to the bitstream to generate a watermarked video. This sequence can be decoded for rendering, stored for later use (PVR), or forwarded further along the transmission pipeline.

The second step may be implemented at the head-end, like the origin server in an OTT scenario. All segment requests are escalated to the origin server that is then in charge of producing a serialized segment containing a unique sequence of variants that encodes part of the watermark identifier associated to the entity querying the segment. In A/B watermarking, it amounts to returning either version A or version B of the requested segment. In such an integration, all segment requests reach the origin server so there is no cache. While it precludes large scale deployments, such integration may be appropriate in some low volume cases such as screeners, hospitality window, or mezzanine content distribution.

The second step may be implemented at the client device. In this case variant metadata may travel along with the video from the head-end down to the device. To keep control over the bandwidth overhead, such integration usually requires having variants of the finest possible granularity. When the serialization process operates on the cleartext encoded bitstream, its integration within a Trusted Execution Environment (TEE) may be recommended for security reasons. Alternately, the different variants may be encrypted with different keys and each device provisioned with a unique set of keys that provide access to a unique Sequence of variants. Such crypto-binding of the access to variants has been standardized for ISO BMFF and for Blu-ray discs.

The second step is preferably implemented as ABR segment selection on the edge. A/B segment selection is when the selection is performed between prepared segments of A/B variants just in time for each client segment request. Here, the serialization step of a two-step watermarking system is performed in the edge servers. The video delivery system needs to deliver a unique sequence of A and B segments to every individual. This can be achieved by making the edge servers select either A or B version of the segment to be returned when they receive a segment request. When the version of the segment, i.e. the variant, has been selected, the edge server can then query the cache possibly to the origin server which delivers it to the recipient.

ABR segment selection on the edge may be required in cases where byte-range indexed playlists are used, or the playlist is templated (such as with Smooth Streaming and DASH VoD profiles) and segments cannot be addressed individually. The serialization effort during playlist delivery is eliminated and the same playlist can be used for all streams. However, the edge needs to apply logic to decide for each requested segment. This logic includes identification of the information to be embedded, a decision for segment selection, and the delivery of the corresponding segment. The fact that all recipients receive the same playlist provides an extra layer of security against comparison and manipulation of playlists before the content is downloaded. It is recommended to make use of https-based segment URIs or other strategies to avoid local ISPs from further caching the seemingly "common" content segments after they leave the CDN edge, thus destroying the A/B serialization pattern.

Some edge servers can perform late repacketization operations on the segment content itself. This allows for segments to not only be selected on the edge allowing choice between A/B, but preceding assembly of these segments even after they have been requested. The idea is to use a single video transport protocol between the origin server and edge servers to optimize caching capabilities and perform repacketization operations (container and scrambling) at the edge to deliver segments in the desired format. Such repacketization implies that the encoded video buffers are available in cleartext at some point. For two-step watermarking systems that use variants at a finer granularity than the whole segment, it provides an opportunity to perform the serialization step at the edge. In this case, the transmission of variants metadata alongside the video can be significantly lower than the ratio inherent to A/B watermarking where storage is doubled, and cache is doubled for A/B segments. This approach is not limited to ABR, it can apply to any progressive download and employs, a common playlist for all subscribers.

As not all CDN providers support outgoing requests to be processed on their CDN edge server, it is not always possible to access an external mapping table while processing a fragment request. Such mapping table is normally used to map a byte-range request to time to enable the selection of the correct variants to be delivered to the requestor. Without access to the mapping table on the CDN edge server, the watermark decision cannot be computed, as the byte-range cannot be linked to time.

To enable a byte-range request to be processed without a mapping table, the temporal information indicating the position of a variant in time is encoded in the length of the variants. Hereto the known two-step watermarking is modified and improved as follows.

In the content preparation step, i.e. the first step, padding is applied to the variants of the fragments to encode "time" information corresponding to each fragment. After the padding, the variants of a fragment have the same adjusted length, wherein the length can be used to derive the temporal position of the variants compared to variants of other fragments. Optionally, padding may be applied to the video content such that all watermark variants of a fragment have the same size before adjusting the length to encode the temporal information.

In the watermarking step, i.e. second step, for each virtual fragment request the byte-range information may be used to compute the fragment size of the variants in the byte-range. Based on this fragment size of the variants the "time information" may extracted.

Thus, the necessity of having a lookup table to relate byte positions to time is avoided.

It will be understood that instead of using the size of a variant in the byte-range request, the fragment start positions or offsets could be used to obtain the temporal information, as the start position or offset depends on the length of the variants.

The time information encoded in the length of the variants by adding padding typically only needs to account for a limited number of 'watermark symbols'. In the specific case of watermarking, a message may be constructed of a sequence of watermark symbols of length N that is repeated over time. Therefore, the padding added can be minimized as only a small number of 'watermark symbols' need to be encoded.

FIG. 2 shows an exemplary embodiment of a method of processing video fragments, such as $f_1 \ldots f_4$, into two or more variants, such as $V_A$ and $V_B$, of the video fragment, each variant having a different watermark. In step 101 a video content 10 is fragmented into a sequence of fragments. In step 102 a plurality of the fragments $f_1 \ldots f_4$ is watermarked to create two or more variants of each of the plurality of fragments, wherein the two or more variants of one fragment are watermarked using different watermarks. Step 103 indicates that the watermarking of step 102 may be repeated for each fragment $f_1 \ldots f_4$ that is to be watermarked to create the sets of variants of the fragments. In step 104 the length of the two or more variants is adjusted for at least one of the fragments to a same adjusted length. For example, for a first fragment $f_1$ the length of the two variants $V_A$ and $V_B$ may be adjusted to have the same length. Thus, $f_1 V_A$ and $f_1 V_B$ will have the same length. Typically, this is also done for the variants of the other fragments $f_2 \ldots f_4$. Step 105 indicates that the adjusting of step 104 of the length may be repeated for the variants $V_A$, $V_B$ of each fragment $f_1 \ldots f_4$. The adjusted length may be indicative of a temporal position of the two or more variants of the at least one of the fragments compared to variants of other fragments in the sequence of fragments. Step 110 indicates the end of the process, wherein the sets 20, 21 of variants of the fragments after adjusting the lengths of the variants are obtained.

The result of the adjusting of step 104 of the length is for example as follows. The length of $f_2 V_A$ and $f_2 V_B$ (which are equal in length) may become one larger than $f_1 V_A$ and $f_1 V_B$ (which are equal in length). The length of $f_3 V_A$ and $f_3 V_B$ (which are equal in length) may become one larger than $f_2 V_A$ and $f_2 V_B$ (which are equal in length). And the length of $f_4 V_A$ and $f_4 V_B$ (which are equal in length) may become one larger than $f_3 V_A$ and $f_3 V_B$ (which are equal in length). Thus, the adjusted lengths of the variants may be used to derive a temporal position of the variant based on the length of a variant compared to the length of a previous variant. It will be understood that the present disclosure is not limited to this particular example of increasing the length of subsequent variants by 1, only having four fragments $f_1 \ldots f_4$ and having two variants $V_A$, $V_B$ for each fragment.

FIG. 3 shows an example of a method for selecting variants of video fragments for delivery to a requestor. In step 201 a request is received for all or a part of a video content that has been fragmented into a sequence of fragments, wherein a plurality of the fragments has been watermarked to create two or more variants of each of the plurality of the fragments according to the method shown in FIG. 2. In step 202 a temporal position is determined of the two or more variants of a fragment compared to variants of other fragments in the sequence of fragments. In step 203, for each of the plurality of the fragments, one variant is selected from the two or more variants based on the determined temporal position and an identifier of the requestor, wherein the identifier defines which of the two or more variants to select for each fragment based on the temporal position. Thus, for a particular end user a unique variant sequence 210, such as 30, 31, may be created.

FIG. 4 shows an example of A/B watermarking according to an exemplary embodiment of the present disclosure, wherein the watermark message to be generated for the byte-range request has a length of 32 symbols. In this example, the watermark message to be generated—and which may be and typically is repeated—equals "ABBBAA-BAABBBABABAABBBAAAAABABBBA". Herein, the location of each of the symbols A and B can be derived as a symbol index 0 to 31, wherein e.g. the first "A" has a symbol index of 0 and the last "A" has a symbol index of 31.

The encoder output after fragmenting a video content into a sequence of fragments and A/B watermarking the fragments is shown in the leftmost table 41 of FIG. 4, wherein for eleven group of pictures fragments GOP #0 . . . GOP #10 the size of the A and B watermarked variants are shown. These variants are for example formatted as H.264 or HEVC fragments in an elementary stream (ES).

Initial alignment 301 of the A and B variants may be applied, the result of which is shown in the second table 42 of FIG. 4. Initial alignment 301 may be required to support switching at fragment boundaries between version A/B of a content using byte range requests. Also, the encoder output as shown in the leftmost table 41 of FIG. 4 is mostly different in size for the A and B variants due to differences in the applied watermark, e.g. 16393 bytes and 16235 bytes for GOP #0 with watermark A and watermark B, respectively. Padding may be applied to make A/B equal in size, e.g. 16393 bytes for GOP #0, such that a byte requests to access Fragment(N) uses the same 'start-end' byte-range for both A and B versions. The variants after the initial alignment may still be formatted as e.g. H.264 or HEVC fragments in an elementary stream (ES). The initial padding typically needs to remain present in the final container format used during OTT streaming, most commonly (fragmented) MP4 or TS.

The variants of the GOP fragments may be converted 302 from e.g. H264 or HEVC format into another container and packet format, e.g. a CMAF container format with MP4, fragmented MP4 or TS fragments. The result of this conversion is shown in the third table 43 of FIG. 4, wherein the group of pictures GOP #0 . . . GOP #10 have been converted into fragments Frag #0 . . . Frag #10, respectively, and e.g. the variants of Frag #0 have a length of 17051 bytes. The fragments Frag #0 . . . Frag #10 may be similar to the fragments $f_1 \ldots f_4$ of the example of FIG. 1 and the variants may be similar to the variants $V_A$ and $V_B$ of the example of FIG. 1.

The fourth table 44 of FIG. 4 shows the result of encoding 303 the symbol index, as indicated in table 45, into the length of the variants. Additional padding may be applied to the fragments to encode positional information. The additional padding may be added equally to both AB versions of the fragments to encode the temporal information. This enables positional information that could normally be obtained from the file name (index number or timestamp) and is unavailable in byte-range requests, to be encoded.

For example, to encode a symbol index for 32 positions, at most 31 bytes of padding would be needed when using the following modulo calculations:

$mod_0(N)=size_0(N)$MODULO 32, wherein $size_0$ is the size after initial alignment of a fragment $N$, e.g. as shown in the third table of FIG. 4;

padding$(N)=(32+$SymbolIndex$(N)-mod0(N))$ MODULO 32;

$size_1(N)=size_0(N)+$padding$(N)$, wherein $size_1$ is the size after additional padding of fragment $N$, e.g. as shown in the fourth table of FIG. 4.

Recovery of the positional information, e.g. at the CDN Edge, may be performed when receiving the byte-range request. The size of the request, carefully tuned by the padding earlier, may be used to determine the encoded position, i.e. symbol index, for a requested fragment N using the following modulo calculation:

SymbolIndex$(N)=size_1(N)$MODULO 32

For example, a byte range request may be received for Frag #3, which has a length of 19139 in the fourth table of FIG. 4. The symbol index for this Frag #3 can be obtained by calculating 19139 MODULO 32, which results in a SymbolIndex=3. For the requestor requesting this byte range the watermark message was determined before to be "ABBBAABAABBBABABAABBBAAAAABABBBA". At symbol index 3 of this watermark message the symbol B is indicated, thus the variant to be returned in response to the byte range request is the B variant of the MP4 fragment.

In the above examples fragment length (size in bytes) may indicate the temporal position of a fragment n. This may be formulated as the position of a fragment n being defined by a function of the length of the fragment n: position[n]=function(length[n]), where the function is for example a modulo M, resulting in the following formula in this example: position[n]=length[n] modulo M.

Some length values may be assigned to be invalid. For instance, the ones that map to positions larger than a maximum. Use of invalid length values, especially when requesting variants, may signal and error and may be logged. An error may be signaled for example if function(length[n])>MAX, where MAX is a predefined value known to be invalid. Such security measure may be used to detect invalid and potentially illegal attempts to obtain variants, e.g. by hackers.

When subsequent variants have equal lengths, a complete file may be requested when a single valid length value. For instance, if a first fragment is 12000 bytes in length which maps to first position, an attacker may ask the following byte-ranges: 0-12000, 12000-24000, 24000-36000, 36000-48000, and so on. As all lengths are the same and valid, these requests may be served as if it is the first fragment.

As a counter measure against requesting subsequent fragments using the same length value, the length of one or more variants may be varied by an offset of the variant to the lengths, effectively also changing the temporal positions. The position may then be represented as a function of the start-offset, length and optionally a secret (key): position[n]=function(length[n], offset[n], optional secret).

Some offset-length pairs (or corresponding position values) may be assigned to be invalid. For example, an error may be signaled and/or logged if "function(length[n], offset[n], optional secret)>MAX", similar to the example above without using the offset. With such counter measure, the attack stated above is likely to fail.

When applying offsets, the first call will typically have offset 0, but the subsequent ones may have different offsets. A function(length[n], offset[n], secret) may involve a cryptographic hash function or encryption in addition to the function, such as the modulo M function described above. The position of a fragment n may thus be obtained using position[n]=hash(length[n], offset[n], secret) modulo M in this example.

The secret may be system wide, per distributor or per content. The CDN should typically know the corresponding secret in order to process the content requests.

The processing step to determine the adjusted length needs to be run in order. Notice that the start offset of the current fragment depends on the lengths of the previous fragments. In pseudo-code the processing may include the following steps for obtaining the temporal positions including the offsets:

offset[0]=0;
find padding[0] which makes function(length[0]+padding [0], offset[0], secret)==0;
offset[1]=offset[0]+length[0]+padding[0];
find padding[1] which makes function(length[1]+padding [1], offset[1], secret)==1;
...;
offset[i]=offset[i−1]+length[−1]+padding[i−1];
find padding[i] which makes function(length[i]+padding [i], offset[i], key)==i.

When using byte-range requests, the requests may include the start-offset (offset[0] in the example above) and the length (or the start-offset and the end-offset). Thus, the start-offset or the end-offset may be used as an indicator or to obtain for the temporal position or the requested fragment.

When the start-offset is zero, the temporal position may map to position[0]=0 by default. When the start-offset is non-zero, i.e. there is data before the first fragment (e.g. header), then the preceding section (e.g. header) may be padded as needed. In case of the end-offset, the current fragment may be padded to make the end-offset indicate the correct position.

In an embodiment, it may be assumed that the start-offset is used to indicate the position as follows: position[n] =function(offset[n], secret). Since the offset for the next fragment may typically be expressed as offset[n+1]=offset [n]+length[n] (and both may be given in the byte-range request), it may be computed that position[n+1]=function (offset[n]+length[n], secret). Herein it may be required that position[n+1]=position[n]+1 or position[n+1]=0 if position [n] is the last position in a limited sequence.

The codecs used in the above examples are not to be construed to limit the scope of this disclosure. Other codecs may be used, such as one of the following. There have been two main audio/video codecs in the last decade: AVC (H.264) and VP9. These two are being replaced, respectively by HEVC (H.265) and AV1. VP9 can now be used with MP4, as part of the Common Media Application Format (CMAF).

HTTP Live Streaming (HLS) will support fragmented MP4 (fMP4) files in the form of the Common Media Application Format (CMAF). This MPEG-ratified media format, which relies on the ISO Base Media File Format (ISOBMFF) commonly known as MP4 (MPEG-4 Part 12 or ISO/IEC 14496-12), relies on this fundamental baseline format of the MPEG-4 standard to allow for fragmented or segmented streaming of MP4 files using a byte-range addressing scheme. CMAF is now MPEG-A Part 19, or ISO/IEC 23000-19.

CMAF is intended to be codec-agnostic, meaning that it can be used with either AVC or HEVC and, potentially AV1.

One or more embodiments of the disclosure may be implemented as a computer program product for use with a computer system. The program(s) of the program product may define functions of the embodiments (including the methods described herein) and can be contained on a variety of computer-readable storage media. The computer-readable storage media may be non-transitory storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information may be permanently stored; and (ii) writable storage media (e.g., hard disk drive or any type of solid-state random-access semiconductor memory, flash memory) on which alterable information may be stored.

The invention claimed is:

1. A method of processing a multimedia fragment into two or more variants of the multimedia fragment, the method comprising:
   fragmenting a multimedia content into a sequence of fragments;
   watermarking a plurality of the fragments to create two or more variants of each of the plurality of the fragments, wherein the two or more variants of one fragment are watermarked using different watermarks; and
   adjusting a length of the two or more variants for at least one of the fragments to a same adjusted length, wherein the adjusted length is indicative of a temporal position of the two or more variants of the at least one of the fragments compared to variants of other fragments in the sequence of fragments, wherein the temporal position is defined as a position within a limited number of possible positions that is repeated in time, and wherein the adjusted length reflects the position of a variant having the adjusted length within the limited number of possible positions.

2. The method of claim 1, wherein the adjusting of the length comprises adding padding data to one or more of the variants of the at least one of the fragments.

3. The method of claim 1, further comprising equalizing the length of the two or more variants for each of the fragments before adjusting the length, wherein the equalizing of the length comprises adding padding data to one or more of the two or more variants.

4. The method of claim 1, wherein the adjusting of the length results in the length of the variants of the at least one of the fragments to be larger than the length of the variants of a preceding fragment in the sequence of fragments.

5. The method of claim 4, wherein the length of the variants of the at least one of the fragments is a predefined number of data units larger than the length of the variants of the preceding fragment in the sequence of fragments.

6. The method of claim 1, wherein a watermark that is used for watermarking the variants of one fragment is the same as or related to a watermark used for watermarking the variants of other fragments.

7. The method of claim 1, wherein the temporal position of the variant is derivable from the length of the variant modulo the limited number of possible positions.

8. The method of claim 1, wherein the watermarking is an A/B watermarking for adaptive bit rate multimedia content, wherein the A/B watermarking comprises watermarking a fragment by using either a first watermark version to obtain a first variant of a first fragment or a second watermark version to obtain a second variant of the first fragment.

9. The method of claim 1, wherein the temporal position of one or more of the two or more variants is derivable from an offset of a variant.

10. A method for selecting variants of multimedia fragments for delivery to a requestor, the method comprising:
    receiving a request for all or a part of a multimedia content that has been fragmented into a sequence of fragments, wherein a plurality of the fragments has been watermarked to create two or more variants of each of the plurality of the fragments;
    determining a temporal position of the two or more variants of a fragment compared to variants of other fragments in the sequence of fragments; and selecting for each of the plurality of the fragments one variant from the two or more variants based on the determined temporal position and an identifier of the requestor, wherein the identifier defines which of the two or more variants to select for each fragment based on the temporal position, wherein the temporal position is defined as a position within a limited number of possible positions that is repeated in time, and wherein the temporal position is determined from a length of the variant modulo the limited number of possible positions.

11. The method of claim 10, wherein the request is received as represented by a byte-range request.

12. The method of claim 10, further comprising detecting an out of bounds request indicative of the request being made to incorrect or non-existing variants.

13. The method of claim 10, wherein the determining of the temporal position is further based on an offset of one or more of the two or more variants.

14. The method of claim 13, wherein the offset is received with the request.

15. The method of claim 10, wherein the two or more variants of one fragment are watermarked using different watermarks.

16. A variant-preprocessor module for processing a multimedia fragment into two or more variants of the multimedia fragment, the variant-preprocessor module configured to:

fragment a multimedia content into a sequence of fragments;

watermark a plurality of the fragments to create two or more variants of each of the plurality of the fragments, wherein the two or more variants of one fragment are watermarked using different watermarks; and adjust a length of the two or more variants for at least one of the fragments to a same adjusted length, wherein the adjusted length is indicative of a temporal position of the two or more variants of the at least one of the fragments compared to variants of other fragments in the sequence of fragments, wherein the temporal position is defined as a position within a limited number of possible positions that is repeated in time, and wherein the adjusted length reflects the position of a variant having the adjusted length within the limited number of possible positions.

17. The variant-preprocessor module of claim 16, wherein, to adjust the length, the variant-preprocessor module is configured to add padding data to one or more of the variants of the at least one of the fragments.

18. The variant-preprocessor module of claim 16, wherein the variant-preprocessor module is further configured to equalize the length of the two or more variants for each of the fragments before adjusting the length, wherein the equalizing of the length comprises adding padding data to one or more of the two or more variants.

* * * * *